Nov. 15, 1949     R. K. WELLMAN     2,487,912
MEANS FOR CLAMPING ELECTRICAL CONDUITS
Filed Jan. 15, 1948
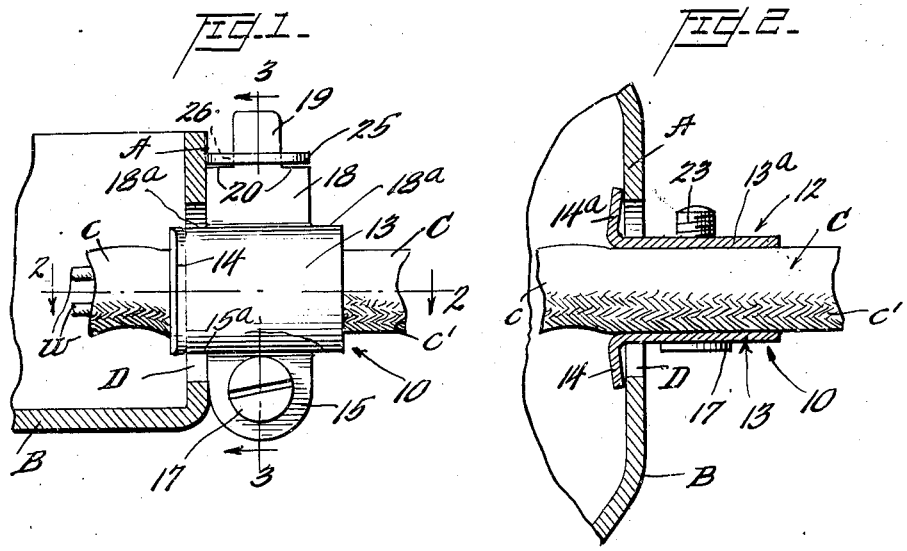
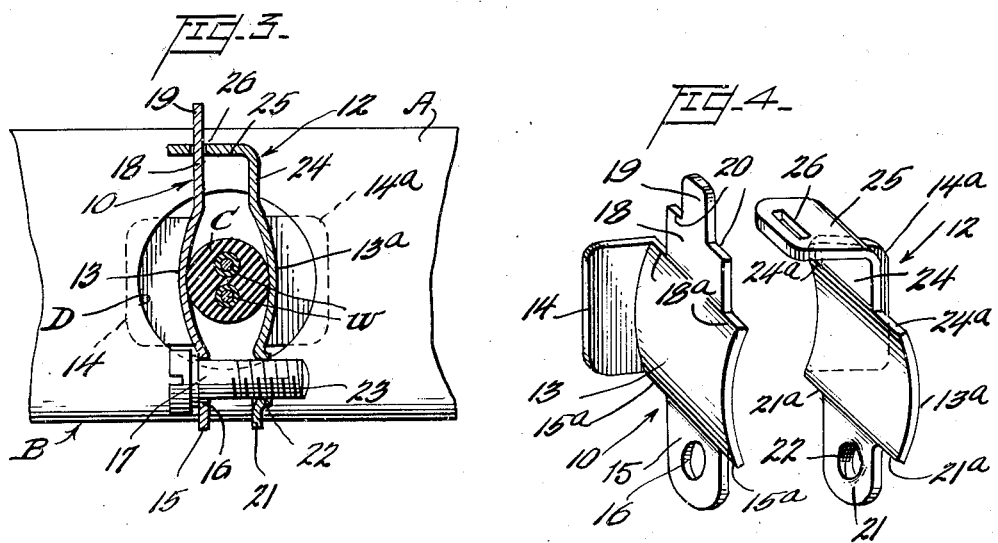
Inventor
Rudyard K. Wellman
By Rowl & Rowl
Attorneys.

Patented Nov. 15, 1949

2,487,912

UNITED STATES PATENT OFFICE 2,487,912

MEANS FOR CLAMPING ELECTRICAL CONDUITS

Rudyard Kipling Wellman, St. Clair Shores, Mich., assignor to Wellward Tool Company, Inc., Detroit, Mich., a corporation of Michigan Application January 15, 1948, Serial No. 2,495

1 Claim. (Cl. 285—6.5)

The invention relates to clamping means for securing electrical conduits or cables to apertured electric outlet boxes or similar structures, and has for its objects to provide an improved simple and efficient device for such purpose which may be manufactured in quantity in the form of metal stampings at relatively small cost.

A further object of the invention is to provide a clamping device of the character described which is composed of a minimum number of parts which may be readily assembled on the electrical conduit adjacent an aperture in the outlet box for the purpose of securing the cable in rigid and immovable relation to the apertured wall of the box. This is for the purpose of taking up and absorbing pulling strains imparted to the cable and preventing such strains from being imposed upon the usual current outlet binding posts to which the cable is secured on the interior of the box. The device may be disassembled or dismantled with equal facility when desired and is of such character as to be adapted for use with a variety of electrical cable conduits of different sizes, as well as with outlet boxes having cable receiving apertures of varying diameter therein.

The improved cable clamping device of the instant invention is of such simple and efficient structural character as to be capable of being stamped out of sheet metal with a minimum number of forming operations, and essentially comprises two opposed complementary separate cable embracing and clamping members or plates of generally similar cooperating configuration so as to enable the parts to be readily interlocked and secured in clamping relation to the cable and to the outlet box, through the medium of a single clamping screw engageable with such complementary clamping plate members.

Numerous other objects and advantages of the invention will be apparent as it is better understood from the following description which, taken in connection with the accompanying drawings, discloses a preferred embodiment thereof.

Referring to the drawings:

Fig. 1 is a view in side elevation of the assembled clamp member and electrical cable or conduit, and illustrating the same in secured position to the apertured side wall of an electric terminal box, such as a switch box, outlet box or the like.

Fig. 2 is a transverse sectional view on line 2—2 of Fig. 1.

Fig. 3 is a vertical sectional view on the line 3—3 of Fig. 1.

Fig. 4 is a perspective view of the two complementary members or plates constituting the clamp in separated or disassembled relation.

Referring to the drawings, the interconnecting cooperating clamp members comprise two complementary rigid elements or plate members 10 and 12 formed of metal or plastic and which may be formed for example of sheet metal stampings. Each element includes an intermediate outwardly curved or convex cable holding portion 13, 13a respectively terminating at one end in angular outwardly extending preferably integral flange portions or feet 14, 14a disposed in substantial alignment and extending in opposite directions when the parts are assembled. The clamp element 10 at one side of its outwardly curved intermediate portion 13, is provided with a projecting ear or lug 15 preferably of reduced width and set off from said intermediate portion by aligned ledges or shoulders 15a. The ear 15 is preferably provided with a substantially central shouldered aperture 16 for the loose reception therethrough of a single suitably headed and/or slotted securing bolt or screw 17, with a minimum of clearance or tolerance. The opposite portion of the clamp element 10 preferably includes a substantially flat straight rigid wall portion 18 inwardly set off from the intermediate curved portion 13 by a ledge or shoulder 18a, said wall portion 18 in turn terminating in an inwardly offset aligned projecting tongue 19 of reduced width so as to leave oppositely disposed flat shoulder or ledge portions 20 at the juncture of said wall and tongue.

The remaining complementary clamp element 12 is similarly provided at one side of its outwardly curved convex intermediate portion 13a, with a flat projecting ear or lug 21 set off from said intermediate portion by oppositely extending aligned shoulders or ledge portions 21a. Said ear 21 is provided with a central preferably internally threaded aperture 22 for the reception therein of the threaded inner end 23 of the single screw or bolt element 17. The opposite portion of the member 12 preferably comprises a flat substantially straight integral wall portion 24 inwardly set off from the intermediate curved portion 13a by opposed shoulders 24a. Said wall portion 24 in turn terminates in an angularly extending wall part or flange member 25 having an elongated slot or recess 26 therein for the loose reception of the tongue 19 of the described complementary clamping member 10.

From the foregoing it will be apparent that the described complementary clamp members 10 and 12 may be readily and conveniently assembled in conjunction with an electric cable or conduit C so as to securely anchor the cable to the clamp members and with the latter in rigid immovable relation to the wall A of an electric terminal box or the like B having the usual aperture D to receive therethrough the cable C and the interconnected oppositely extending flange portions 14, 14a of the clamping elements or plate members 10 and 12.

It will be understood that the terminal box B houses and protects any desired electrical outlet or source of current (not shown) to which the wires w of the enclosed end c of the cable are communicably connected as by the usual binding posts, and the opposite or exterior end c' of the cable may lead to any desired switch controlled electrical fixture where the current to be utilized may be energized at the will of the consumer.

In assembling the parts on the switch or outlet box or cable terminal casing B through the aperture D, the tongue element 19 of clamping element 10 is loosely inserted into its mating aperture or slot 26 of the remaining element 12. With said elements disposed in loose engagement with opposite sides of the cable C on the exterior of the box, the angular oppositely extending feet 14, 14a of the thus loosely engaged clamp elements 10 and 12 are fitted or inserted through the box aperture D.

Aperture 16 of the element 10 is then brought into opposed registry with the threaded aperture 22 of element 12 and the holding screw or bolt 17 is loosely inserted through the former aperture and its inner threaded end 23 is rotated into holding engagement with the aligned threaded aperture 22 of element 12. Through the medium of a screw driver or the like the member 17 is further rotated to draw the opposed aligned ear portions 15 and 21 closer together until the respective intermediate curved portions 13, 13a thereof fulcrum outwardly upon the cable in tight clamping engagement therewith which is effectively obtained as soon as the tongue 19 bears against the slot 26 in tight non-slipping or immovable relation. The aligned cut away shoulder portions 15a, 18a, 21a and 24a at the inner sides of the engaged clamping members, are of sufficient width to afford clearance with a minimum of tolerance for the box wall A so as to immovably fit in fixed relation between the oppositely projecting integral box engaging flange portions or feet 14, 14a and the adjacent edges of the diametrically opposed wall portions 18, 24 and ears 15, 21 of the clamping elements, as best shown in Fig. 1 of the drawings.

From the foregoing it will be apparent that when the parts are engaged as described, any strains imparted to or placed upon the exterior of the cable or conduit C are transmitted thereby through the engaged clamp elements 10 and 12 and box engaging parts thereof, outwardly away from the cable to the wall A of the box, thereby relieving the inner enclosed portion c of the cable from receiving any of such strains which might otherwise tend to loosen or disrupt its connection with the enclosed electrical binding posts or its other means of attachment to the source of electrical current.

As best seen in Fig. 2, the parts 14, 14a of the clamp members are inclined rearwardly to engage at their outer ends only against the inner surface of the box wall A adjacent the aperture D, thereby forming a slight acute angle, for example 87°, with the intermediate portions 13, 13a of the respective clamp members. By virtue of this construction it will be apparent that when the screw or bolt 17 is threaded inwardly to engage the parts in clamping relation, the clamp members 10 and 12 are locked against the box wall as the intermediate portions 13, 13a tightly clamp the cable C. Therefore neither the cable nor the clamp will turn relative to the outlet box when the locking bolt 17 is screwed home, and such relative rotation is effectually prevented at all times.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

Means for clamping an electrical conduit to an outlet box having a conduit receiving aperture therein, comprising a pair of separable complementary plate members each having an intermediate conduit engaging portion terminating at one end in an angular outwardly extending flange for engaging the interior of the box wall adjacent said aperture, an aperture ear portion extending from one side of each of said intermediate portions of said members and a wall extending from the opposite side thereof, corresponding aligned edges of a said ear and wall being spaced inwardly from said flange to engage against the box wall adjacent said aperture, said walls of the respective members having tongue and slot engaging means, and a single threaded fastening member engaging the apertures of said ears to draw said members together to clamp the electric conduit therebetween with their said angular flanges engaging the inner box wall surface adjacent its said aperture.

RUDYARD KIPLING WELLMAN.

REFERENCES CITED

The following references are of record in the file of this patent:

UNITED STATES PATENTS

| Number | Name | Date |
| --- | --- | --- |
| 1,885,228 | Buchanan | Nov. 1, 1932 |
| 2,175,097 | Thomas | Oct. 3, 1939 |